United States Patent [19]
Saito et al.

[11] Patent Number: 5,431,514
[45] Date of Patent: Jul. 11, 1995

[54] METHOD AND APPARATUS FOR PROCESSING A CYLINDER AND A ROTATING MEMBER OF A VIDEO CASSETTE RECORDER

[75] Inventors: Norihisa Saito; Masaichi Sato, both of Tokyo, Japan

[73] Assignee: Canon Kabushiki Kaisha, Tokyo, Japan

[21] Appl. No.: 175,578

[22] Filed: Dec. 30, 1993

[30] Foreign Application Priority Data

Jan. 13, 1993 [JP] Japan .................... 5-004320
Oct. 21, 1993 [JP] Japan .................... 5-263662

[51] Int. Cl.6 .................... B23C 3/00; B23B 5/00
[52] U.S. Cl. .................... 409/132; 82/131; 82/146; 409/165; 409/199; 409/226
[58] Field of Search .................... 409/65, 66, 75, 76, 409/131, 132, 165, 166, 167, 168, 199, 211, 226, 228, 229; 82/131, 146

[56] References Cited

U.S. PATENT DOCUMENTS

| 2,206,770 | 7/1940 | Drummond | 409/199 |
| 2,208,572 | 7/1940 | Drummond | 409/165 |
| 3,276,329 | 10/1966 | Saliba | 409/211 |
| 3,486,415 | 12/1969 | Woodward | 409/76 |
| 5,125,775 | 6/1992 | Breuer et al. | 409/199 |

FOREIGN PATENT DOCUMENTS

| 1031187 | 5/1958 | Germany | 409/165 |
| 3445004 | 6/1986 | Germany | 82/146 |

*Primary Examiner*—Daniel W. Howell
*Attorney, Agent, or Firm*—Fitzpatrick, Cella, Harper & Scinto

[57] ABSTRACT

A method of processing a leading portion of a rotating workpiece is performed by rotating a tip mounted on a cutter shaft and facing an outer circumferential surface of the workpiece. The tip has a small radius of rotation for high precision processing with small cutting resistance. The leading portion is cut by the tip with the cutter shaft inclined to a side opposite to the leading portion of the workpiece with respect to a direction orthogonal to the axis of rotation of the workpiece.

13 Claims, 11 Drawing Sheets

WHEN A TIP HAS A LARGE
DIAMETER OF ROTATION

FIG.12(b)

WHEN A TIP HAS A SMALL
DIAMETER OF ROTATION

METHOD AND APPARATUS FOR PROCESSING A CYLINDER AND A ROTATING MEMBER OF A VIDEO CASSETTE RECORDER

BACKGROUND OF THE INVENTION

1. Field of the Invention

This invention relates to a method and apparatus for processing a leading portion, or edge, of a cylindrical member having a predetermined angle of inclination. More particularly, the invention relates to a method and apparatus for cutting a leading portion of a cylindrical rotating member for running a tape in a video cassette recorder (VCR) by rotating a cutting tip mounted on a main shaft and facing an outer circumferential surface of the cylindrical rotating member.

2. Description of the Related Art

Recently, in order to improve the performance of VCR's, an inclined-azimuth recording method has been adopted, and high precision is required for processing a cylinder to guide the running of a tape.

Figure 11:
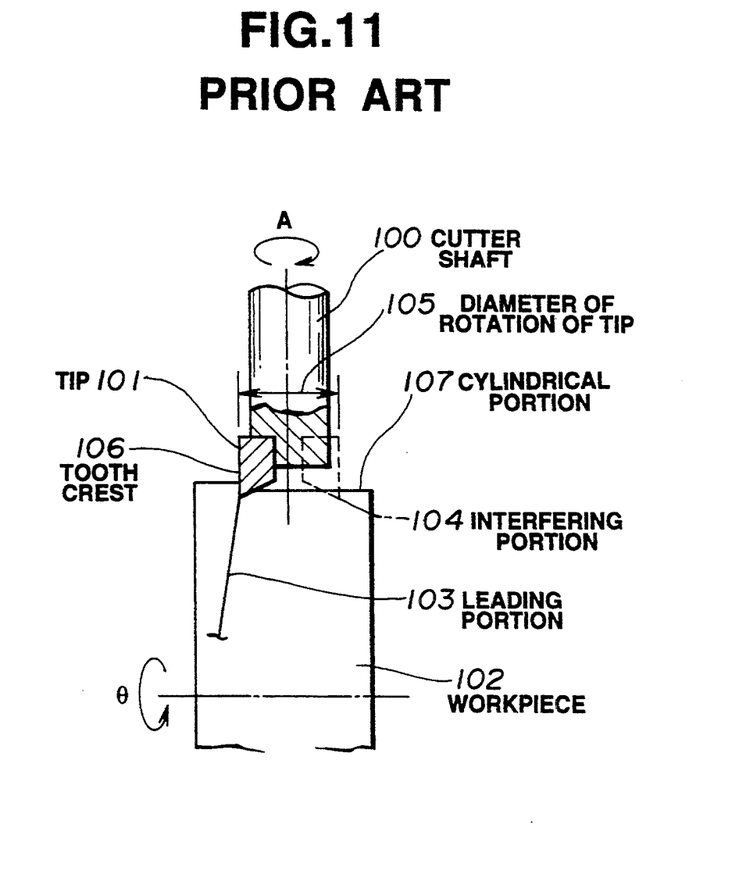

That is, as shown in FIG. 11, a cylindrical portion 107 having a spiral leading portion 103 is formed on an outer circumference of cylindrical workpiece 102. High precision is desired for processing the cylindrical portion 107, because, for example, a higher quality output is obtained when the space between the tape and a reproducing head is reduced. Variations occur in the output, reducing its quality, if the space changes. Strict conditions are required to form a precise spiral leading portion 103 for guiding the tape, since an imprecise shape of leading portion 103 may cause fluctuations in the running of the tape, and thereby cause a disturbance in the reproduced image.

A method for processing a leading portion of a cylinder, serving as a workpiece, by a rotating cutter has been disclosed in Japanese Patent Application Publication No. 1-25647 (1989). In this method, as shown in FIG. 11, the above-described leading portion 103 is cut by a tip 101 in a state in which the axis of rotation of cutter shaft 100 rotating in the direction of arrow A is orthogonal to the axis of rotation of workpiece 102 rotating in the direction of arrow θ. The diameter of rotation of tip 105 is about 20 mm.

In the above-described conventional approach, however, as shown in FIG. 11, when a tip 101 having a small diameter of rotation 105 is used, cylindrical portion 107, which serves as a running surface for the tape, is also unnecessarily processed, or cut, by the tip 101, as indicated by the broken lines of interfering portion 104 at a position 180° from where the leading portion 103 is processed. This damages the running surface guiding the tape.

Figure 12A:
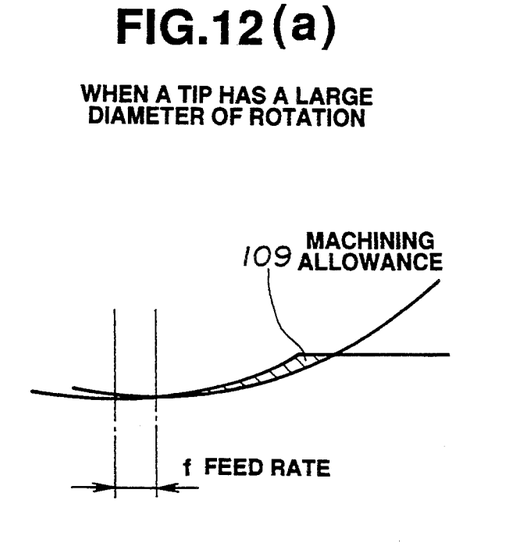
Figure 12B:
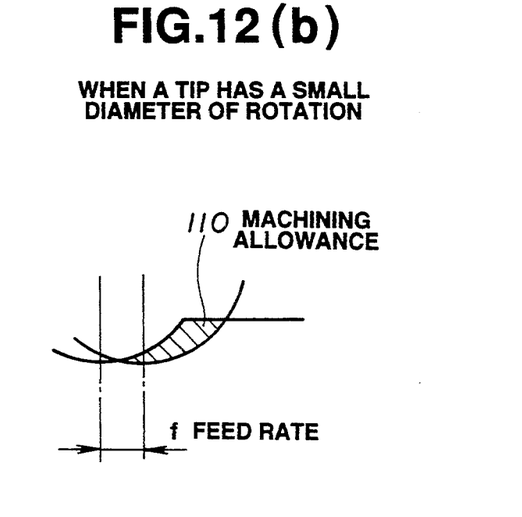

On the other hand, when a tip 101 having its diameter of rotation of 105 so large that the running surface is not damaged, the width of the cross section of depth of cut 109, as shown in FIG. 12(a), for the feed rate f per revolution of the cutter shaft increases as compared to the width of the cross-section of the depth of cut 110 (from a tip having a small diameter of rotation) as shown in FIG. 12(B). This cuases an increase in the processing resistance and a decrease in the accuracy of the linearity of the leading portion. In addition, since a main shaft for mounting a tip having a large diameter of rotation is required, the size of the processing apparatus increases.

SUMMARY OF THE INVENTION

The present invention has been made in consideration of the above-described problems.

It is an object of the present invention to provide a method and a small apparatus for processing a cylinder and a rotating member of, for example, a VCR, which can provide a small cutting resistance and which can perform high-precision cutting work.

According to one aspect of the present invention, a method for processing a leading edge of a cylindrical workpiece using a rotating tip comprises the steps of mounting the tip on a distal end of a rotatable main shaft such that the tip has a small diameter of rotation, rotating the workpiece about an axis of rotation, inclining the main body shaft mounting the tip to a side opposite to the leading edge of the cylindrical workpiece with respect to a direction orthogonal to the axis of rotation, and cutting the leading edge of the workpiece with the rotating tip.

In accordance with another aspect of the present invention, a method for processing an inclined surface of a rotating member comprises the steps of mounting the rotating member on an output shaft rotatable about an axis of rotation, mounting a rotatable shaft including a tool for processing the outer circumference of the rotating member along an angle of inclination, and cutting a leading locus of the rotating member to have a predetermined angle of inclination with respect to an axis orthogonal to the axis of rotation of the rotating member.

In one embodiment, the rotating member comprises a rotating cylinder of a video cassette recorder, and the angle of inclination of the inclined surface is a leading angle for running a video tape.

In another embodiment, the angle of inclination of the tool equals 3°–10° with respect to the orthogonal axis.

In still another embodiment, the diameter of rotation of a tip of the tool equals 6 mm–10 mm.

According to still another aspect of the present invention, an apparatus for processing a cylindrical workpiece comprises means for rotating the cylindrical workpiece along an axis of rotation, a rotatable main shaft having a cutting tip mounted at a distal end and having a small diameter of rotation, with the tip facing an outer circumferential surface of the cylindrical workpiece, and rotating means for rotating the main shaft to cause the tip to cut the workpiece. In addition, mounting means mounts the rotating means and the main shaft, the main shaft mounted to Me inclined to a side opposite a leading portion of the cylindrical workpiece with respect to a direction orthogonal to an axis of rotation of the workpiece rotated by tghe workpiece rotating means.

According to yet another aspect of the invention, an apparatus for processing a workpiece comprises means for rotating the workpiece along an axis of rotation, a rotatable spindle having a cutter shaft, and a cutting tip mounted on a distal end of the cutter shaft and positioned to cut an outer surface of the workpiece. Also provided is rotating means for rotating the spindle and mounting means for mounting the spindle to be inclined to a side opposite a leading portion of the workpiece with respect to a direction orthogonal to the axis of rotation of the workpiece.

In one embodiment, the apparatus further comprises an adjusting mechanism for adjusting the angle of inclination of the main shaft.

In another embodiment, the cylinder is rotatably supported by a flange member via a shaft, and the workpiece is held by pressure contact of a fixing jig with a reference surface for mounting of the flange member.

According to the present invention having the above-described configuration, by inclining the main shaft mounting the tip to a side opposite to the leading portion, or edge, of the cylinder with respect to the direction orthogonal to the dirving shaft for rotating the workpiece, the tip does not interfere with the cylindrical portion, serving as a running surface for a tape, and a tip having a small radius of rotation can be used, whereby the cutting resistance is reduced.

The foregoing and other objects, advantages and features of the present invention will become apparent from the following description of the preferred embodiments taken in conjuction with the accompanying drawings.

BRIEF DESCRIPTION OF THE DRAWINGS

FIG. 3 is an enlarged view, partially in cross-section, of a principal portion of the processing apparatus shown in FIG. 1, illustrating a workpiece, a driving shaft for rotating the workpiece, a cutter shaft and the like;

FIG. 4 is an enlarged view of a principal portion of the processing apparatus shown in FIG. 1, illustrating the workpiece, the cutter shaft and the like;

FIG. 10 is an enlarged view, partially in cross-section, of the processing apparatus shown in FIG. 9, illustrating a workpiece, a driving shaft for rotating the workpiece, a cutter shaft and the like;

FIG. 11 is an enlarged view of a principal portion of a conventional processing apparatus, illustrating a workpiece, a cutter shaft and the like; and FIGS. 12(a) and 12(b) are diagrams each illustrating the depth of cut for the feed rate of a workpiece; FIG. 12(a) illustrates a case in which a tip has a large diameter of rotation, and FIG. 12(b) illustrates a case in which a tip has a small diameter of rotation.

DESCRIPTION OF THE PREFERRED EMBODIMENTS

A description will now be provided of preferred embodiments of the present invention with reference to the drawings.

First Embodiment

Figure 1:
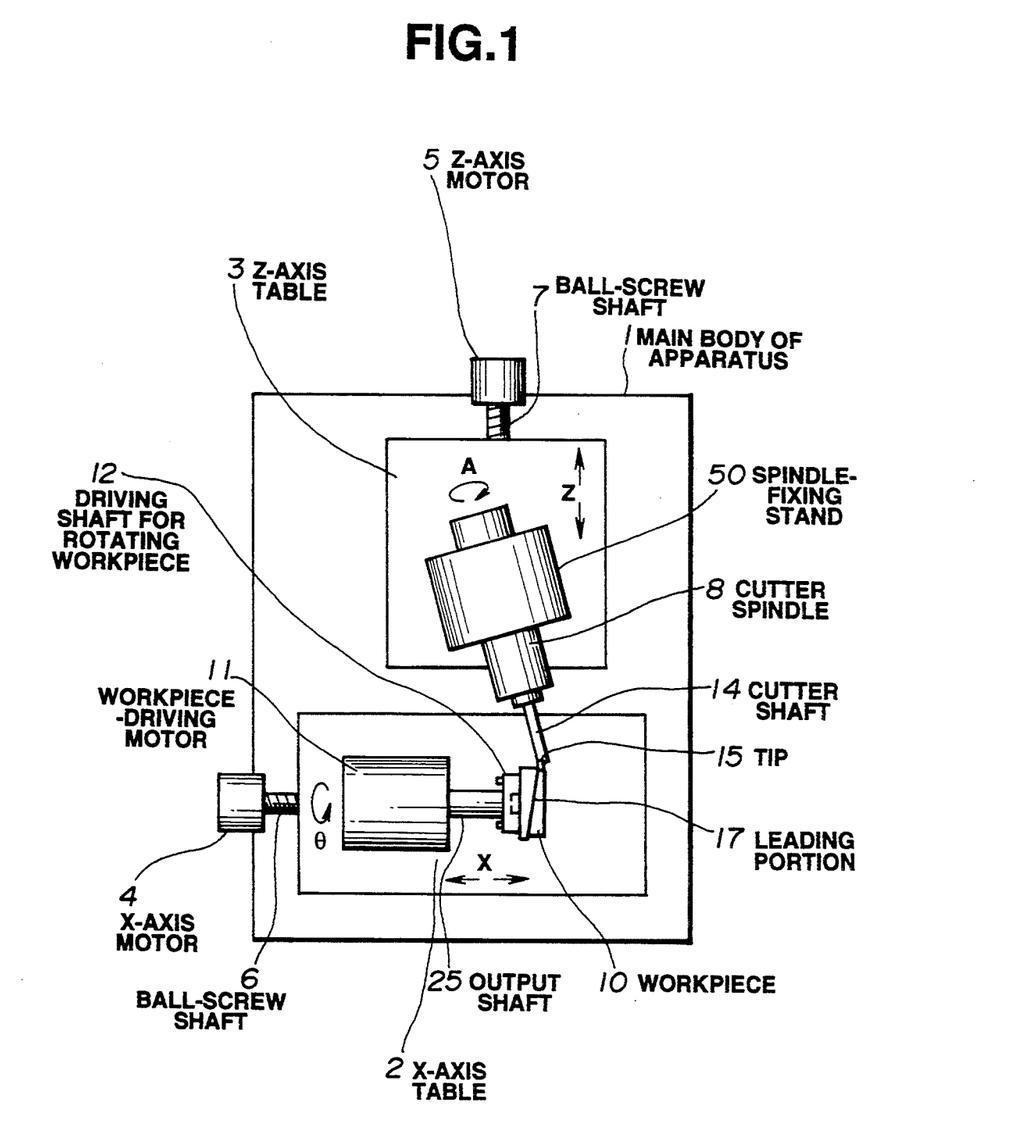
FIG. 1 is a schematic top plan view of an apparatus for processing a cylinder of a video cassette recorder according to a first embodiment of the present invention.
Figure 2:
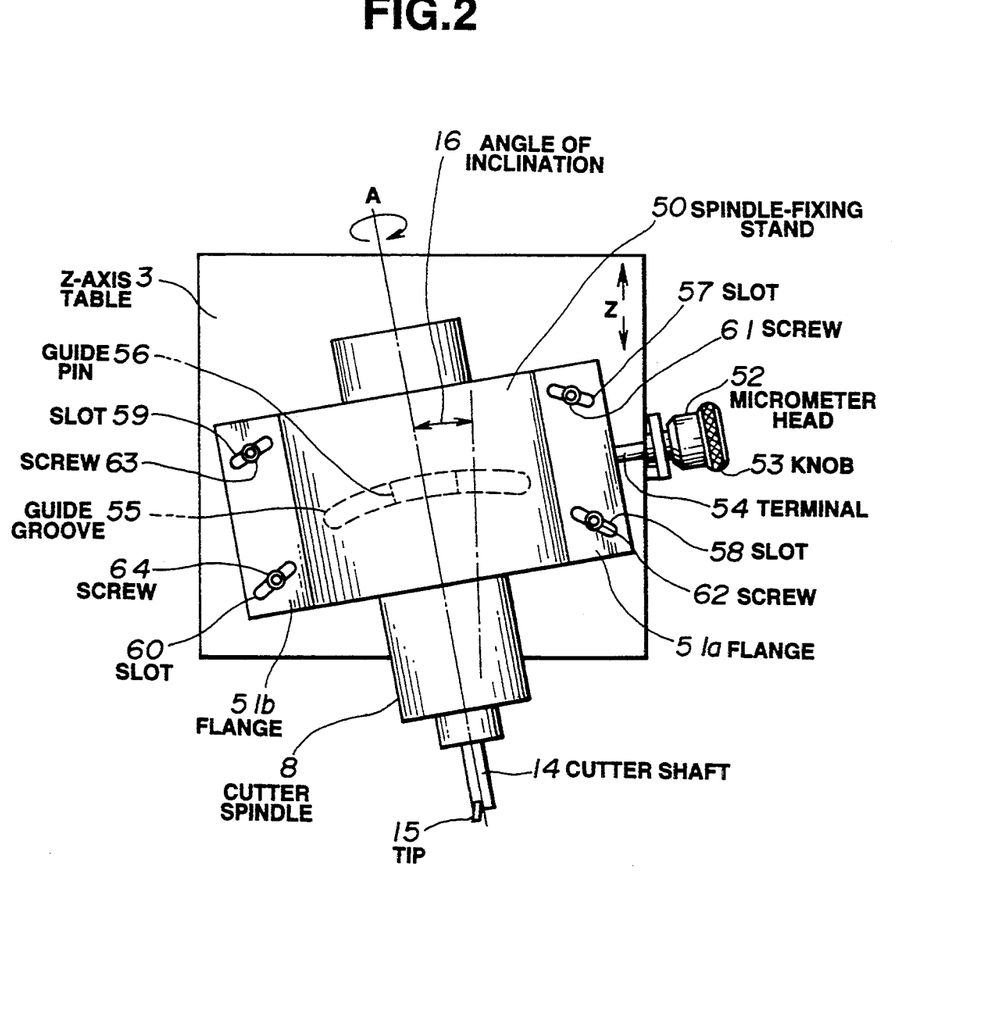
FIG. 2 is an enlarged view of the portion of the z-axis table shown in FIG. 1.
Figure 3:
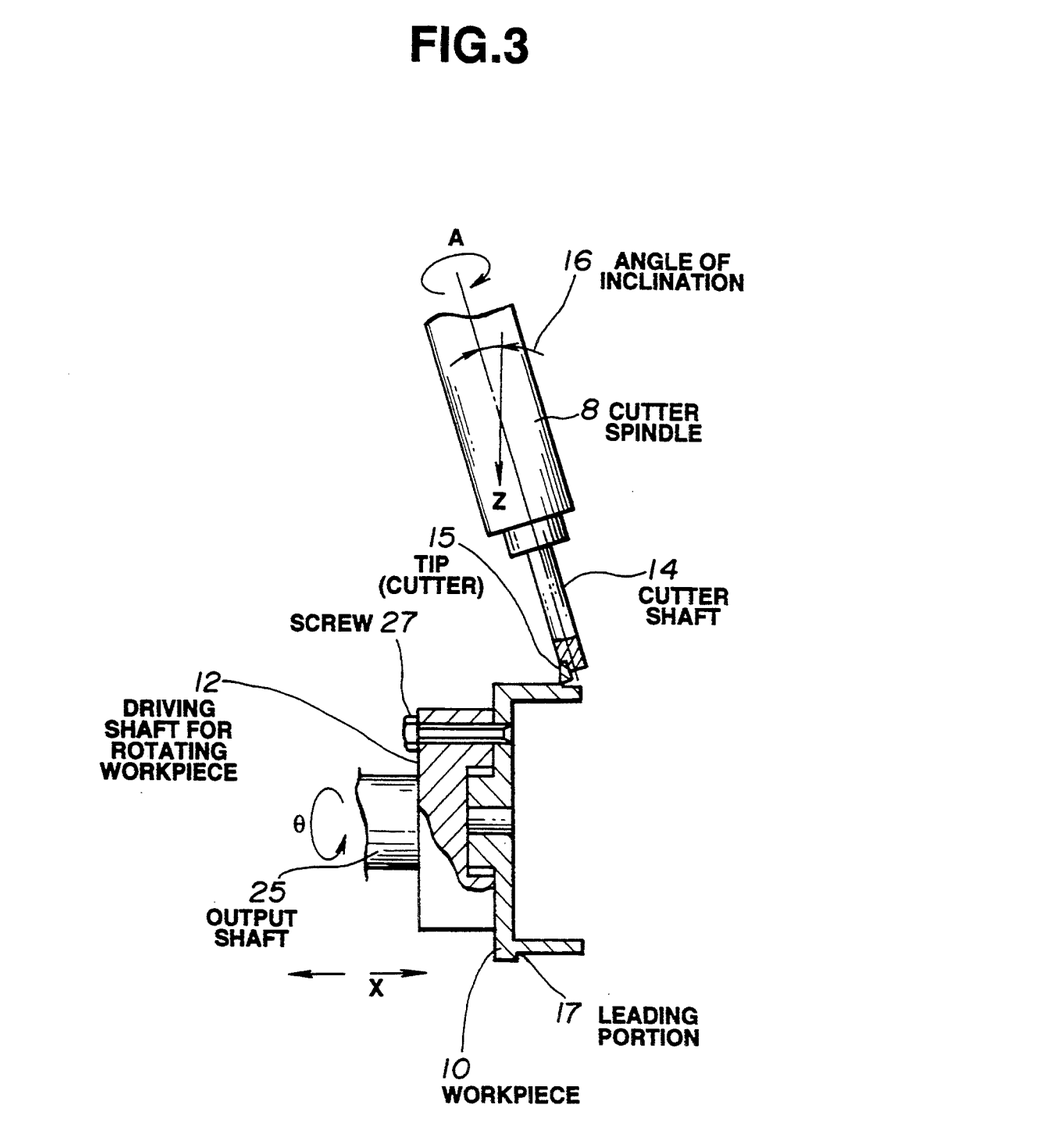
Figure 4:
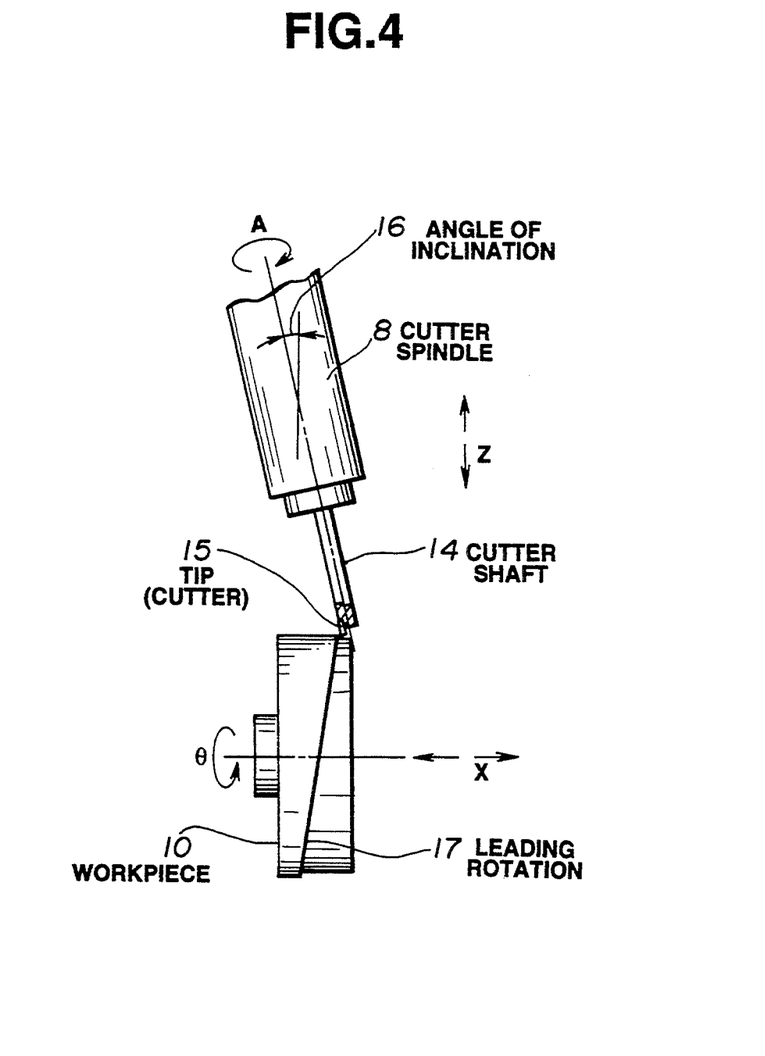
Figure 5:
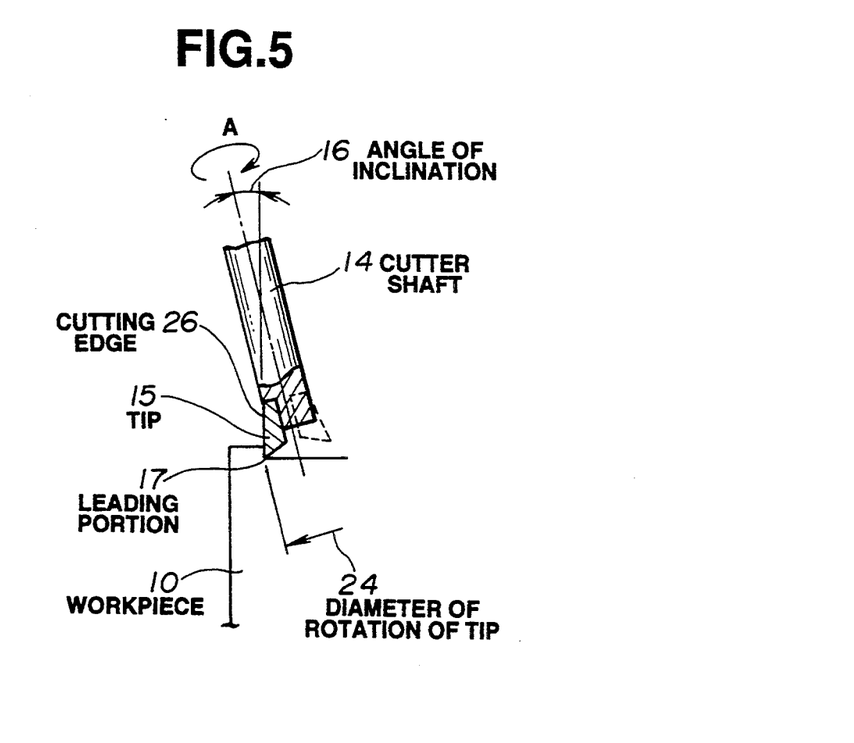
FIG. 5 is an enlarged view illustrating the cutter shaft, the tip and the like shown in FIG. 4.
Figure 6:
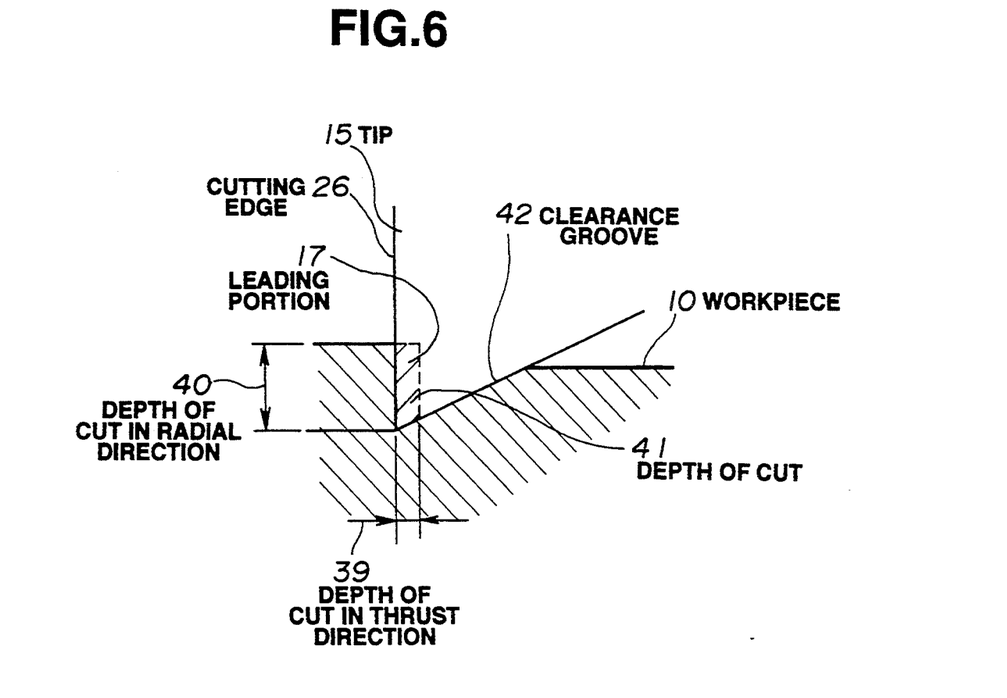
FIG. 6 is an enlarged view of the tip shown in FIG. 5.
Figure 7:
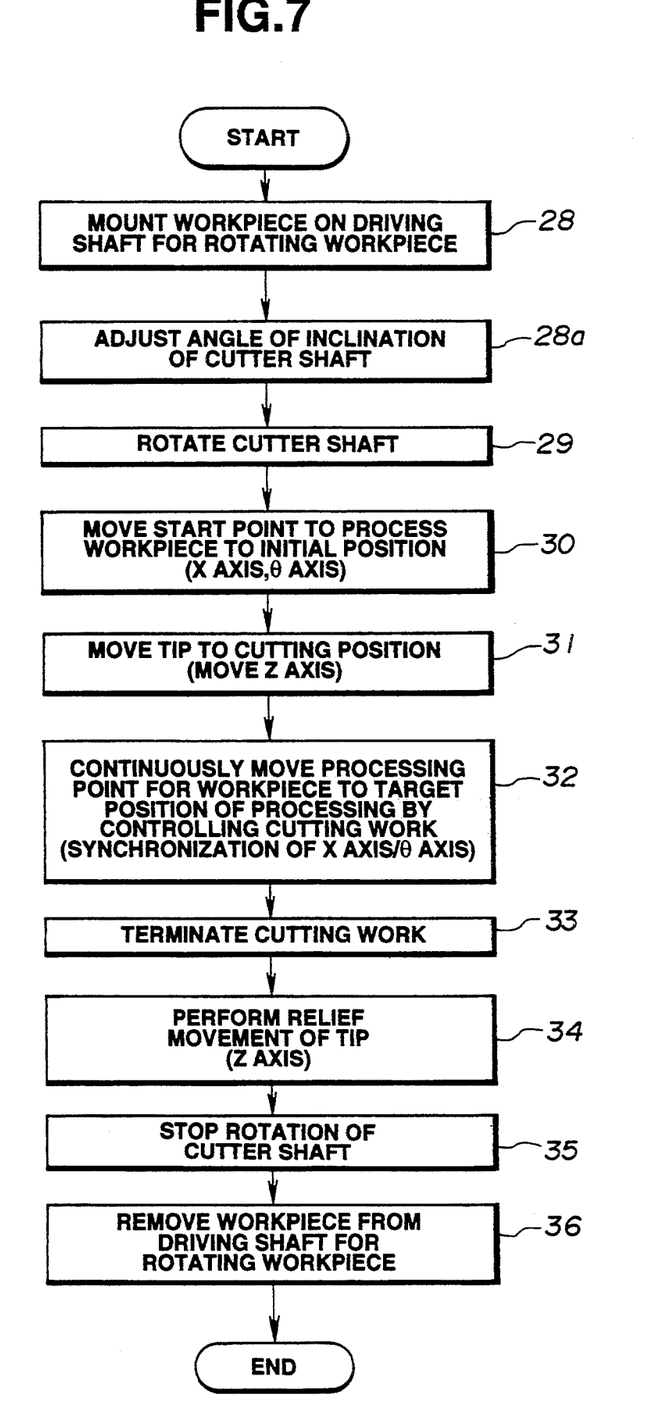
FIG. 7 is a flowchart illustrating the operation of the processing apparatus of the first embodiment.

FIG. 1 is a schematic top plan view of an apparatus for processing a cylinder of a video cassette recorder according to a first embodiment of the present invention. FIG. 2 is an enlarged view of the portion of the z-axis table shown in FIG. 1. FIG. 3 is an enlarged view, partially in cross-section, of a principal portion of the processing apparatus shown in FIG. 1, illustrating a workpiece, a driving shaft for rotating the workpiece, a cutter shaft and the like. FIG. 4 is an enlarged view of a principal portion of the processing apparatus shown in FIG. 1, illustrating the workpiece, the cutter shaft and the like. FIG. 5 is an enlarged view illustrating the cutter shaft, the tip and the like shown in FIG. 4. FIG. 6 is an enlarged view illustrating the tip shown in FIG. 4. FIG. 7 is a flowchart illustrating the operation of the processing apparatus of the present embodiment.

First, a description will be provided of the entire configuration of the apparatus for processing a leading portion of a cylinder of a video cassette recorder according to the present embodiment.

As shown in FIG. 1, x-axis table 2, serving as a workpiece-supporting table, and z-axis table 3, serving as a cutter-supporting table, are provided in a main body 1 of the apparatus so as to be movable in the orthogonal directions of arrows X and arrows Z, respectively. X-axis table 2 is moved in the directions of arrows X by an x-axis motor 4, which is fixed to main body 1 of the apparatus, via a ball-screw shaft 6. Z-axis table 3 is moved in the directions of arrows Z by a z-axis motor 5, which is fixed to main body 1 of apparatus, via a ball-screw shaft 7.

A driving shaft 12 for rotating the workpiece is fixed on an output shaft 25 of a workpiece-driving motor 11. Workpiece 10, serving as the rotating member, has a leading portion 17 and is fixed on the driving shaft for rotation by a screw. When the output shaft is rotated in the direction of arrow θ by starting the workpiece-driving motor, the rotation of the output shaft is transmitted to the workpiece 10 via driving shaft 12, whereby the workpiece is rotated. The feed rate of workpiece 10 is controlled by x-axis motor 4.

A spindle-fixing stand 50 for holding a cutter spindle 8 is provided on z-axis table 3. Cutter shaft 14, serving as a main shaft (a tool-rotating shaft), is rotated by the cutter spindle. Tip (tool) 15 (to be described later) is mounted at a leading-end portion of the cutter shaft. The amount of cutting by the tip 15 is controlled by the z-axis motor.

Next, the structure of the processing apparatus will be described in detail. As shown in FIGS. 3 through 5, the workpiece 10 having the leading portion 17 is mounted on the driving shaft 12 for rotating the workpiece by a plurality of screws 27. Cutter shaft 14 is held by cutter spindle 8, and is rotated in the direction of arrow A. The axis of rotation of cutter spindle 8 and cutter shaft 14 is inclined by angle of inclination 16 to a side opposite to leading portion 17 of workpiece 10 with respect to the direction of arrow Z which is orthogonal to the axis of rotation of driving shaft 12 for rotating the workpiece. Tip 15 is mounted at a leading-end portion of the cutter shaft 14. The tip has a small diameter of rotation 24 (see FIG. 5) of about 6 mm–10 mm in order to reduce the resistance during processing and the size of the apparatus, and to increase the processing speed. Cutting edge 26 (see FIG. 6) of the tip 15 for processing, or cutting, the leading portion 17 extends in the direction of arrow Z.

Cutter shaft 14 is rotated at a predetermined number of revolution per minute by the cutter spindle 8. The cutter spindle is moved to a predetermined cut position by z-axis motor 5, and the position is fixed. Workpiece 10 is moved in the direction of arrow X (the axial direction of workpiece 10) by x-axis motor 4 in synchronization with the angle of rotation $\theta$ (see FIG. 4) of driving shaft 12 for rotating the workpiece. By a single rotation of the workpiece, the target shape of leading portion 17 (the leading locus) is processed. Accuracy in the linearity of leading portion 17 is determined by accuracy in sychronization between the movement of workpiece in the axial direction and the rotation of driving shaft 12 for rotating the workpiece. The surface roughness of the leading portion is determined by diameter of rotation 24 of the tip 15, and the number of revolutions of cutter spindle 8 and driving shaft 12 for rotating the workpiece. In FIG. 6, reference numeral 41 represents the depth of cut of tip 15, reference numeral 40 represents the depth of the cut in the radial direction, and reference numeral 39 represents the depth of the cut in the thrust direction. When the workpiece is rotated one complete turn, a clearance groove 42 can be formed in the workpiece.

The mechanism for adjusting the angle of inclination of the cutter shaft will now be described.

FIG. 2 is a diagram illustrating the mechanism for adjusting the angle of inclination of the cutter shaft of the processing apparatus.

As shown in FIG. 2, cutter shaft 14 is fixed on cutter spindle (spindle shaft) 8, and rotates in accordance with the rotation of cutter spindle 8. The cutter spindle is pivotably supported by spindle-fixing stand 50 (to be described later). The spindle-fixing stand 50 is disposed on the z-axis table 3 at angle of inclination 16 within a predetermined range with respect to the axis of ballscrew shaft 7 (see FIG. 1) of the z-azis table, i.e., the direction of arrow Z. In the present embodiment, the angle of inclination 16 can be adjusted within a range of 3°–10°. Therefore, the cutter shaft 14 is also inclined by this angle of inclination 16 with respect to the direction of arrow Z.

Spindle-fixing stand 50 includes flanges 51a and 51b at two end portions thereof, and two circular slots 57 and 58, and 59 and 60 are formed in flanges 51a and 51b, respectively. Screws 61 and 62,.and 63 and 64 for fixing spindle-fixing stand 50 on z-axis table 3 are threaded through the slots 57 and 58, and 59 and 60 of flanges 51a and 51b, respectively, and are screwed in four screw holes (not shown) in the z-axis table 3. Guide groove 55 is formed in the z-axis table 3 in order to guide the spindle-fixing stand 50. Guide pin 56, which is integrally mounted at a lower-surface portion of spindle-fixing stand 50, is fitted in the guide groove 55. The angle of inclination of the spindle-fixing stand can be adjusted in the range of 3°–10° by guide groove 55 by making the guide pin the center of rotation.

Micrometer head 52 is mounted at a right-side portion of the z-axis table in FIG. 2. Micrometer head 52 includes knob 53 and terminal 54. The spindle-fixing stand 50 can be rotated around tip 15 of cutter shaft 14 by pressing the terminal 54 against the flange 51a of the spindle-fixing stand by rotating knob 53 in a state where the four screws 61, 62, 63 and 64 are loosened. Thus, the angle of inclination 16 can be easily and precisely adjusted.

Next, a description will be provided of the operation of the above-described processing apparatus, that is, the processing method. Conditions of the actual cutting work are as follows:

The diameter of rotation of the tip: 8 mm
The speed of the cutter shaft: 20,000 rpm
The speed of the workpiece: 8 rpm
The depth of cut in the thrust direction: 0.05 mm
The angle of inclination of the cutter shaft: 5°

As shown in FIGS. 1 through 7, first the workpiece 10 to be moved in the axial direction is mounted on the driving shaft 12 by a plurality of screws 27 (step 28 in FIG. 7). The amount of rotation of the spindle-fixing stand 50 is adjusted by rotating the knob 53 of micrometer head 52, whereby the angle of inclination 16 of cutter shaft 14 can be changed. Thereafter, the spindle-fixing stand 50 is fixed on the z-axis table 3 by four screws 61, 62, 63 and 64, whereby the angle of inclination 16 is secured (step 28a in FIG. 7). Although in the present embodiment the angle of inclination 16 is set to 5°, the angle is not limited to this value. The value of angle of inclination 16 is preferably 3°–10° in consideration of the depth of the cut to be made in the radial direction, vibration during the rotation of the tip, and the like. The angle of inclination 16 equals a leading angle for running a video tape.

Thereafter, tip 15 is rotated in the direction of arrow A by starting the cutter spindle 8 (step 29 in FIG. 7). By moving workpiece 10 in the direction of arrow X by starting the x-axis motor 4, and by driving the workpiece-driving motor 11 to rotate the workpiece 10 in the direction of arrow $\theta$, the workpiece 10 is moved to the starting processing point and stopped at an initial position (step 30 in FIG. 7). The tip 15 is moved to a cut position by the z-axis motor 5 and is stopped at that position (step 31 in FIG. 7). By continuously moving the processing point of the workpiece 10 to target positions by performing synchronized control of the x-axis motor 4 and the workpiece-driving motor 11, the leading portion 17 is continuously cut by the tip 15 (step 32 in FIG. 7). After completing the cutting work (step 33 in FIG. 7), the tip 15 is subjected to relief movement in the direction of upper arrow Z by reversing the direction of the z-axis motor 5 (step 34 in FIG. 7) and the z-axis motor is stopped to terminate rotation of the cutter shaft (step 35 in FIG. 7). Finally, the x-axis motor 4 and workpiece-driving motor 11 are stopped, and the workpiece 10 is removed from the driving shaft 12 (step 36 in FIG. 7). Thus, the tip 15 processes the leading portion 17 of the workpiece by rotation of the cutter shaft 14, the movement of the workpiece 10 in the axial direction, and the rotation of workpiece 10.

The cutting work of the leading portion in the above-described manner provides excellent results in linear accuracy of the leading portion equal to or less than 1 $\mu$m, and surface roughness of the leading portion equal to or less than 0.5 $\mu$m.

Figure 8:
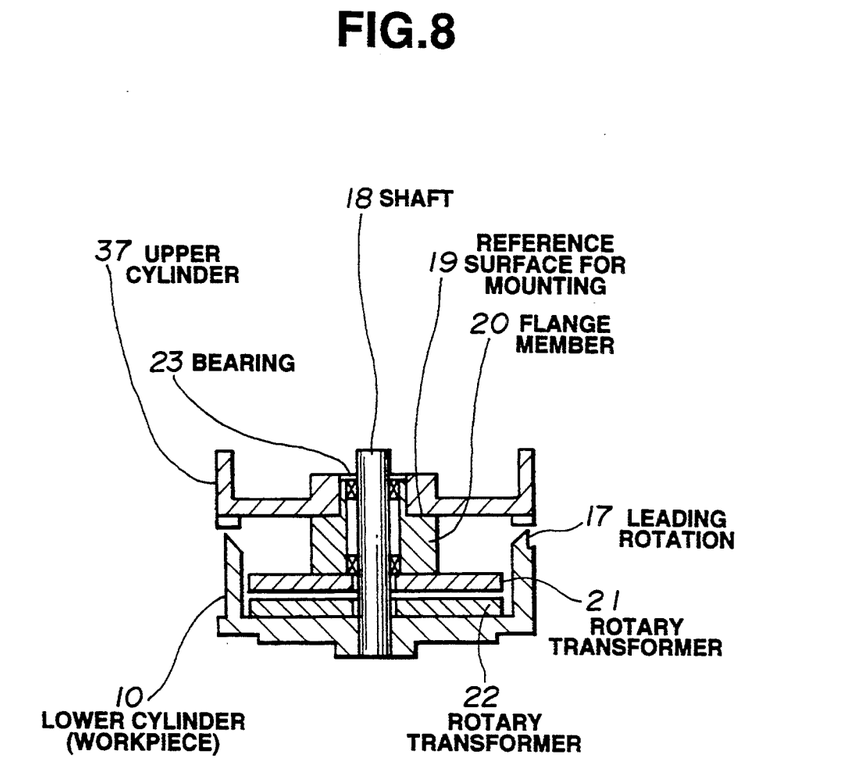
FIG. 8 is a cross-sectional view of a head of a video cassette recorder including an upper cylinder obtained by the processing method of the first embodiment.

FIG. 8 is a cross-sectional view of a head which includes a lower cylinder obtained by the processing method of the present embodiment. Shaft 18 and rotary transformer 22 are secured to the lower cylinder (workpiece) 10, serving as a rotating cylinder. Flange member 20 including rotary transformer 21 is fitted in the assembly via two bearings 23, and upper cylinder 37 is mounted on reference surface 19. The upper cylinder 37 is rotated by driving means (not shown). The lower cylinder 10 is used in a video cassette recorder for a tape having a width of 8 mm.

Second Embodiment

Figure 9:
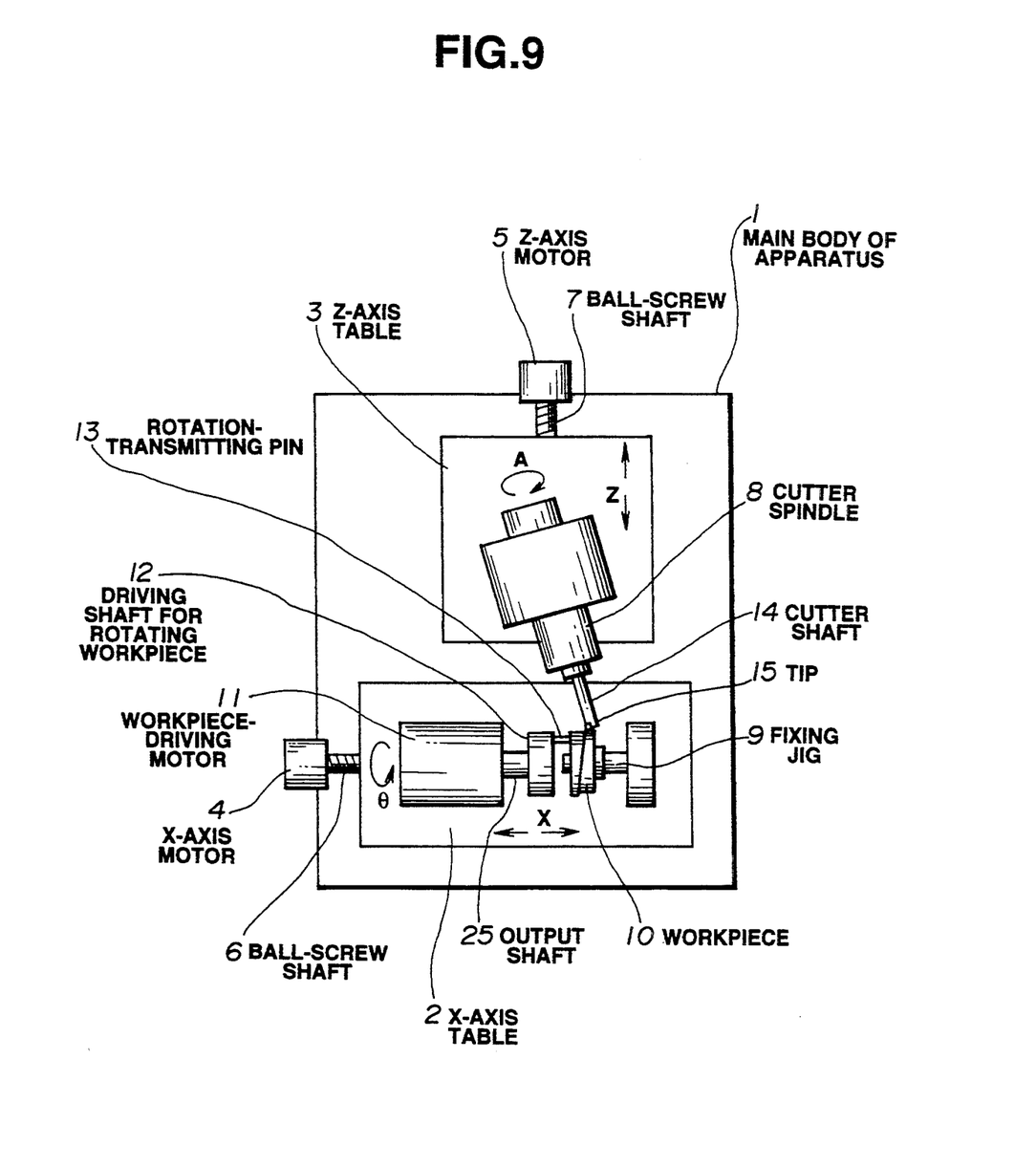
FIG. 9 is a schematic top plan view of an apparatus for processing a cylinder of a video cassette recorder according to a second embodiment of the present invention.
Figure 10:
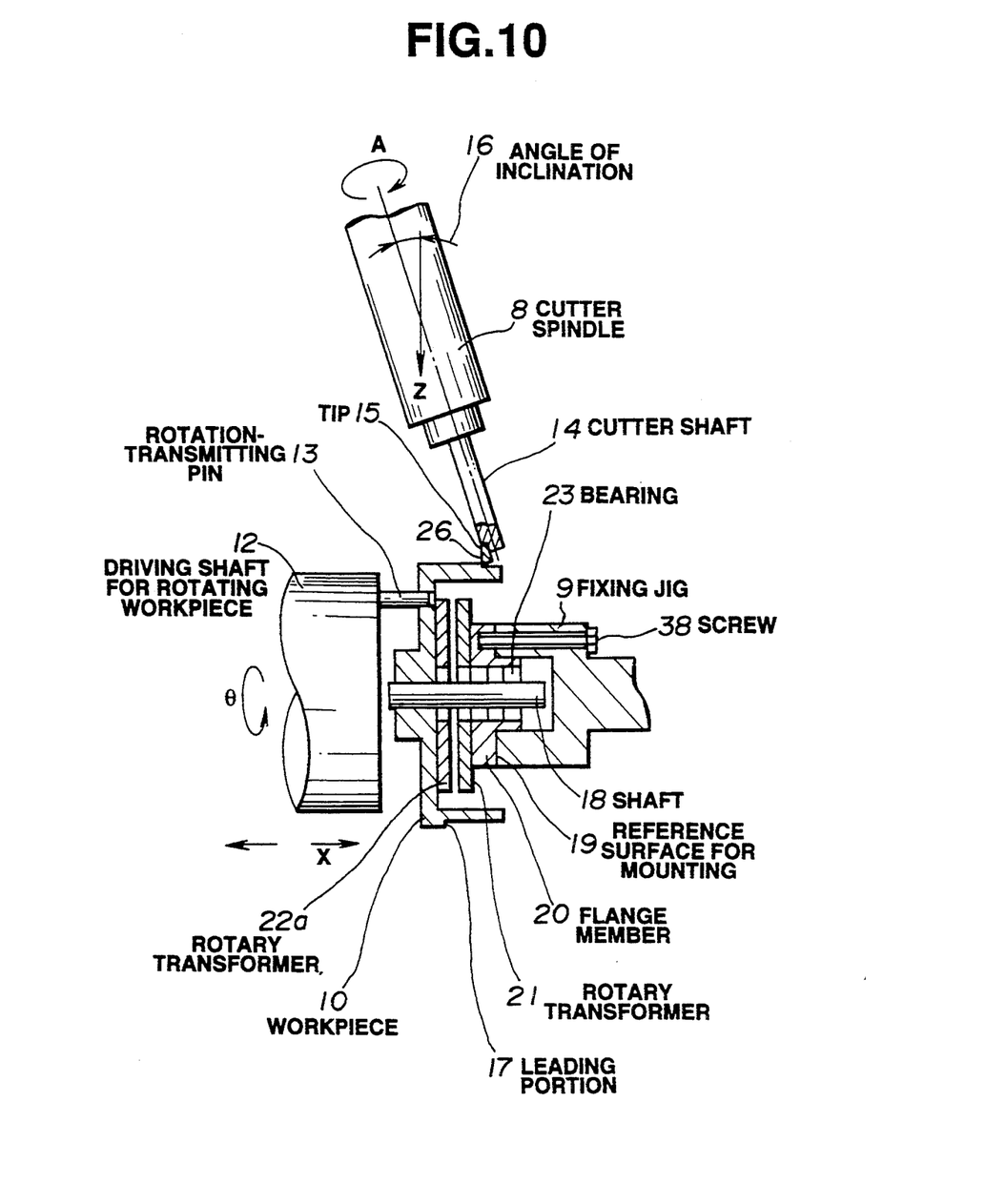

FIG. 9 is a schematic top plan view of an apparatus for processing a cylinder of a video cassette recorder according to a second embodiment of the present invention. FIG. 10 is an enlarged view, partially in cross-section, of a principal portion of the processing apparatus shown in FIG. 9, illustrating a workpiece, a driving shaft for rotating the workpiece, a cutter shaft and the like.

As shown in FIG. 9, a workpiece-driving motor 11 and a fixing jig 9 are fixed on x-axis table 2, and driving shaft 12 for rotating the workpiece includes a rotation-transmitting pin 13 integrally protruded from an end portion thereof and is fixed on output shaft 25 of the workpiece-driving motor. A workpiece 10, which in this case is a rotating cylinder, is rotatably supported by the fixing jig 9. The rotation-transmitting pin 13 of the driving shaft 12 engages the workpiece 10. When the output shaft 25 is rotated by the workpiece-driving motor 11, the rotation of output shaft 25 is transmitted to the workpiece 10 via the driving shaft 12 and rotation-transmitting pin 13.

As in the first embodiment, cutter spindle 8 is provided on a z-axis table 3. Cutter shaft 14, serving as a main shaft, is rotated by cutter spindle 8. Tip 15 (to be described later) is mounted at a leading-end portion of the cutter shaft. The amount of cutting performed by the tip is controlled by the z-axis motor 5. The mechanism for adjusting the angle of inclination of cutter shaft 14 is not illustrated, but can be the same mechanism described above in connection with the first embodiment.

As shown in FIGS. 9 and 10, the workpiece 10 including the leading portion 17 integrally includes a shaft 18, which is supported by flange member 20 through two bearings 23. The end surface of the fixing jig 9 is pressed against a reference surface 19 for mounting of the flange member by a plurality of screws 38, whereby the workpiece 10 is rotatably supported by the fixing jig 9. Rotary transformers 21 and 22 are provided on the flange member 20 and workpiece 10, respectively. The rotation-transmitting pin 13 of the driving shaft 12 fits in a hole formed at an end portion of workpiece 10. Cutter shaft 14 is held by the cutter spindle, and is rotated in the direction of arrow A. The rotation axis of cutter spindle 8 and cutter shaft 14 is inclined by an angle of inclination 16 to a side opposite to the leading portion 17 of the workpiece 10 with respect to the direction of arrow Z which is orthogonal to the axis of rotation of driving shaft 12 for rotating the workpiece. Tip 15 is mounted at a leading-end portion of the cutter shaft 14. The tip has a small diameter of rotation of about 6–10 mm. Cutting edge 26 of tip 15 is angled with respect to a central axis of the cutter spindle and cutter shaft and extends in the direction of arrow Z.

The cutting work of the leading portion was performed in the same manner as in the first embodiment under the following conditions using the processing apparatus of the second embodiment, and excellent results of linear accuracy of the leading portion equal to or less than 1 μm, and the surface roughness of the leading portion equal to or less than 0.5 μm was obtained:

The diameter of rotation of the tip: 6 mm
The speed of the cutter shaft: 60,000 rpm
The speed of the workpiece: 10 rpm
The depth of cut in the thrust direction: 0.005 mm
The angle of inclination of the cutter shaft: 3°

Although in the above-described embodiments the workpiece is fixed on the driving shaft for rotating the workpiece or the fixing jig by screws, the present invention is not limited to such fixing methods. For example, the workpiece may be fixed by a collet chuck or a vacuum chuck.

The present invention having the above-described configuration has the following features.

In the processing method of the present invention, the tip does not interfere with the running surface of a tape of the cylinder, and the depth of cut by the tip per revolution can be reduced. Hence, the cutting resistance is reduced, and high-precision cutting work of the leading portion can be performed.

Since the processing apparatus of the present invention can use a tip and a cutter spindle each having a small diameter, the size of the processing apparatus can be reduced, the main shaft can be rotated at a high speed, and therefore the processing time can be reduced.

Furthermore, the relative positional error of the leading portion of a replaced workpiece with respect to the position of the head mounted at the upper cylinder can be minimized.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for processing a leading edge of a cylindrical workpiece using a rotating tip, said method comprising the steps of:
    mounting the tip on a distal end of a rotatable main shaft such that the tip has a small diameter of rotation;
    rotating the workpiece about an axis of rotation;
    inclining the main shaft mounting the tip to a side opposite to the leading edge of the cylindrical workpiece with respect to an axis orthogonal to the axis of rotation; and
    cutting the leading edge of the workpiece with the rotating tip.

2. A method according to claim 1, wherein the main shaft is inclined 3°–10° with respect to the orthogonal axis.

3. A method according to claim 1, wherein the diameter of rotation of a tip of the tool equals 6 mm–10 mm.

4. A method for processing an inclined surface of a rotating member, said method comprising the steps of:
    mounting the rotating member on an output shaft rotatable about an axis of rotation;
    mounting a rotatable shaft including a tool for processing the outer circumference of the rotating member along an angle of inclination inclined with respect to an axis orthogonal to the rotational axis of the rotating member; and
    cutting a lead angle of the rotating member located on an outer circumference with respect to its axis of rotation to process together a leading portion of the rotating member in the direction orthogonal to the outer circumference and a clearance groove having a predetermined angle with respect to the leading portion.

5. A method according to claim 4, further comprising the step of providing a rotating cylinder of a video cassette recorder as the rotating member, and wherein the angle of inclination of the inclined surface is a leading angle for running a video tape.

6. A method according to claim 4, wherein the angle of inclination of the tool equals 3°–10° with respect to the orthogonal axis.

7. A method according to claim 4, wherein the diameter of rotation of a tip of the tool is 6 mm–10 mm.

8. An apparatus for processing a cylindrical workpiece, comprising:
　means for rotating the cylindrical workpiece along an axis of rotation;
　a rotatable main shaft having a cutting tip mounted at a distal end and having a small diameter of rotation, said tip facing an outer circumferential surface of the cylindrical workpiece;
　rotating means for rotating said main shaft to cause said tip to cut the workpiece; and
　mounting means for mounting said rotating means and said main shaft, said main shaft being mounted to be inclined to a side opposite a leading portion of the cylindrical workpiece with respect to a direction orthogonal to the axis of rotation of the workpiece rotated by said workpiece rotating means.

9. An apparatus according to claim 8, wherein said mounting means further comprises an adjusting mechanism for adjusting an angle of inclination of said main shaft.

10. An apparatus according to claim 8, wherein said workpiece rotating member includes a flange member and a shaft, and wherein the workpiece is held by pressure contact of a fixing jig with a reference surface for mounting of said flange member.

11. An apparatus for processing a workpiece, comprising:
　means for rotating the workpiece along an axis of rotation;
　a rotatable spindle having a cutter shaft;
　a cutting tip mounted on a distal end of said cutter shaft and positioned to cut an outer surface of the workpiece;
　rotating means for rotating said spindle; and
　mounting means for mounting said spindle to be inclined to a side opposite a leading portion of the workpiece with respect to a direction orthogonal to the axis of rotation of the workpiece.

12. An apparatus according to claim 11, wherein said cutting tip is mounted eccentrically on said cutter shaft to have a small diameter of rotation as said cutter shaft is rotated.

13. An apparatus according to claim 11, wherein said mounting means further comprises an adjusting mechanism for adjusting an angle of inclination of said spindle.

* * * * *

UNITED STATES PATENT AND TRADEMARK OFFICE
CERTIFICATE OF CORRECTION

PATENT NO. : 5,431,514
DATED : July 11, 1995
INVENTOR(S) : Saito et al.

It is certified that error appears in the above-indentified patent and that said Letters Patent is hereby corrected as shown below:

<u>COLUMN 2</u>:

Line 52, "Me" should read --be--.

Signed and Sealed this

Twelfth Day of December, 1995

Attest:

BRUCE LEHMAN

*Attesting Officer*    *Commissioner of Patents and Trademarks*